(12) United States Patent
Grayson et al.

(10) Patent No.: US 7,542,455 B2
(45) Date of Patent: Jun. 2, 2009

(54) UNLICENSED MOBILE ACCESS (UMA) COMMUNICATIONS USING DECENTRALIZED SECURITY GATEWAY

(75) Inventors: Mark Grayson, Maidenhead (GB); Bich Nguyen, Los Altos, CA (US); Ramanathan Jagadeesan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 472 days.

(21) Appl. No.: 11/405,842

(22) Filed: Apr. 18, 2006

(65) Prior Publication Data
US 2007/0242672 A1 Oct. 18, 2007

(51) Int. Cl.
*H04W 4/00* (2006.01)

(52) U.S. Cl. .................. 370/338; 370/395.52; 370/352; 370/392; 455/41.2; 455/41.3; 455/553.1

(58) Field of Classification Search .................. 370/338, 370/352, 392, 395.52
See application file for complete search history.

(56) References Cited

U.S. PATENT DOCUMENTS

| 6,889,045 | B2 * | 5/2005 | Pan et al. ..................... 455/436 |
| 7,171,221 | B1 * | 1/2007 | Amin et al. .................. 455/462 |
| 2002/0137526 | A1 * | 9/2002 | Shinohara .................... 455/456 |
| 2004/0121726 | A1 * | 6/2004 | Bifano et al. .................... 455/8 |
| 2006/0083187 | A1 * | 4/2006 | Dekel .......................... 370/310 |
| 2007/0015463 | A1 * | 1/2007 | Abel et al. .................. 455/41.1 |

OTHER PUBLICATIONS

U.S. Appl. No. 11/136,686, filed May 24, 2005, entitled "System and Method for Providiing Enhanced Handover Performance".
UMA Technology, Extending Mobile Services to Unlicensed Spectrum, http://www.umatechnology.org/technology/index.htm, Apr. 17, 2006, pp. 1 and 2.
UMA Technology, Extending Mobile Services to Unlicensed Spectrum, http://www.umatechnology.org/overview/index.htm, Apr. 17, 2006, pp. 1 and2.

* cited by examiner

*Primary Examiner*—Rafael Pérez-Gutiérrez
*Assistant Examiner*—Liton Miah
(74) *Attorney, Agent, or Firm*—Haynes and Boone, LLP (57) ABSTRACT

Systems and methods are provided to facilitate efficient routing of unlicensed mobile access (UMA) communications. In one implementation, a method of providing a communication link between a first mobile station and a second mobile station through a customer premises equipment (CPE) device includes intercepting a call setup request provided by the first mobile station and received at a security gateway of the CPE device. An address associated with the second mobile station may be extracted from the call setup request and the address may be compared with a plurality of records maintained by the CPE device. A call setup request may be forwarded to the second mobile station if the address corresponds to at least one of the records. The first and second mobile stations may be in communication with the CPE device over a wireless local access network (WLAN) in accordance with an unlicensed mobile communication standard.

18 Claims, 4 Drawing Sheets

UNLICENSED MOBILE ACCESS (UMA) COMMUNICATIONS USING DECENTRALIZED SECURITY GATEWAY

BACKGROUND

1. Field of the Invention

The present invention generally relates to communication systems and more particularly to the routing of communications between users of mobile communication devices.

2. Related Art

Conventional unlicensed mobile access (UMA) communication systems can provide users with the ability to access cellular services through unlicensed spectrum technologies. For example, users of appropriately configured UMA-compatible mobile phones may utilize Global System for Mobile (GSM) and General Packet Radio Services (GPRS) mobile services through wireless local area networks (WLANs) supporting various unlicensed mobile communication standards such as IEEE 802.11 or Bluetooth™.

In conventional UMA systems, communications are routed from a user's mobile station (for example, a UMA-compatible mobile phone) through a WLAN to a broadband Internet Protocol (IP) network which may interface with a UMA network controller (UNC). The UNC may in turn interface with a mobile switching center (MSC) capable of providing voice and SMS services and routing calls to the Public Switched Telephone Network (PSTN). The MSC is also capable of routing the communications to an alternate radio access network (RAN) of a cellular service provider. The UNC may additionally interface to a Serving GPRS Support Node (SGSN) for routing packets to a Gateway GPRS Support Node (GGSN) (which is capable of providing IP services), or routing the communications to an alternate RAN of a cellular service provider. UMA systems may also support seamless handover of cellular voice calls, Short Message Service (SMS) messages, and GPRS based packet services between the RAN and the WLAN.

Security is a dominant concern for providers of UMA-based communications. Conventional UMA configurations typically employ a hub-and-spoke security implementation whereby UMA clients (e.g., phones) establish a long-lived IP Security (IPSec) tunnel to the cellular service provider over which all communications including signaling, voice communications, and data communications are sent. A security gateway may be provided in the UNC to authenticate users, encrypt communications, and perform other relevant conventional security features. Alternatively, a security gateway may be deployed independently of a UNC and an IP network used to route communications between the UNC and the security gateway.

Unfortunately, in circumstances where UMA clients are located in close proximity to each other, such security implementations can lead to inefficiencies. For example, if two UMA clients accessing a common WLAN wish to communicate with each other, a conventional security implementation would typically require the routing of their associated communications from one UMA client through the WLAN and IP network to the UNC where security operations would be performed, to the MSC where voice services are executed, and back through the IP network and WLAN network to the other UMA client. In such a configuration, MSC ports are still provisioned and consumed by such UMA-to-UMA communications. Moreover, bandwidth restrictions on IP networks may limit the number of UMA users which may be simultaneously supported through such a security implementation.

Nevertheless, the use of such co-located intra-UMA communications is becoming increasingly likely. In this regard, cellular service plans often include provisions for unlimited calls between particular user groups. Typically, the user groups who benefit from such packages are families. Hence, multiple users within the same unlimited user group may be frequently located in the same residence.

Other UMA communication inefficiencies may occur where UMA users desire to interact with various IP-based resources available on the Internet. For example, GPRS data communications from UMA users typically must be routed from the user's WLAN through the IP network to the security gateway of the UNC. The UNC then passes communications on to the SGSN which routes communications to a GGSN which then routes communications to the Internet. Unfortunately, because the UMA communications must be routed through the security gateway of the UNC, they are not permitted to be routed directly to the Internet through the IP network connected to the WLAN. As a result, the security implementation defined by UMA may inhibit the optimal routing of IP services.

Accordingly, there is a need for an improved UMA-based security implementation that overcomes the deficiencies discussed above.

BRIEF DESCRIPTION OF THE FIGURES

Like element numbers in different figures represent the same or similar elements.

DETAILED DESCRIPTION

Figure 1:
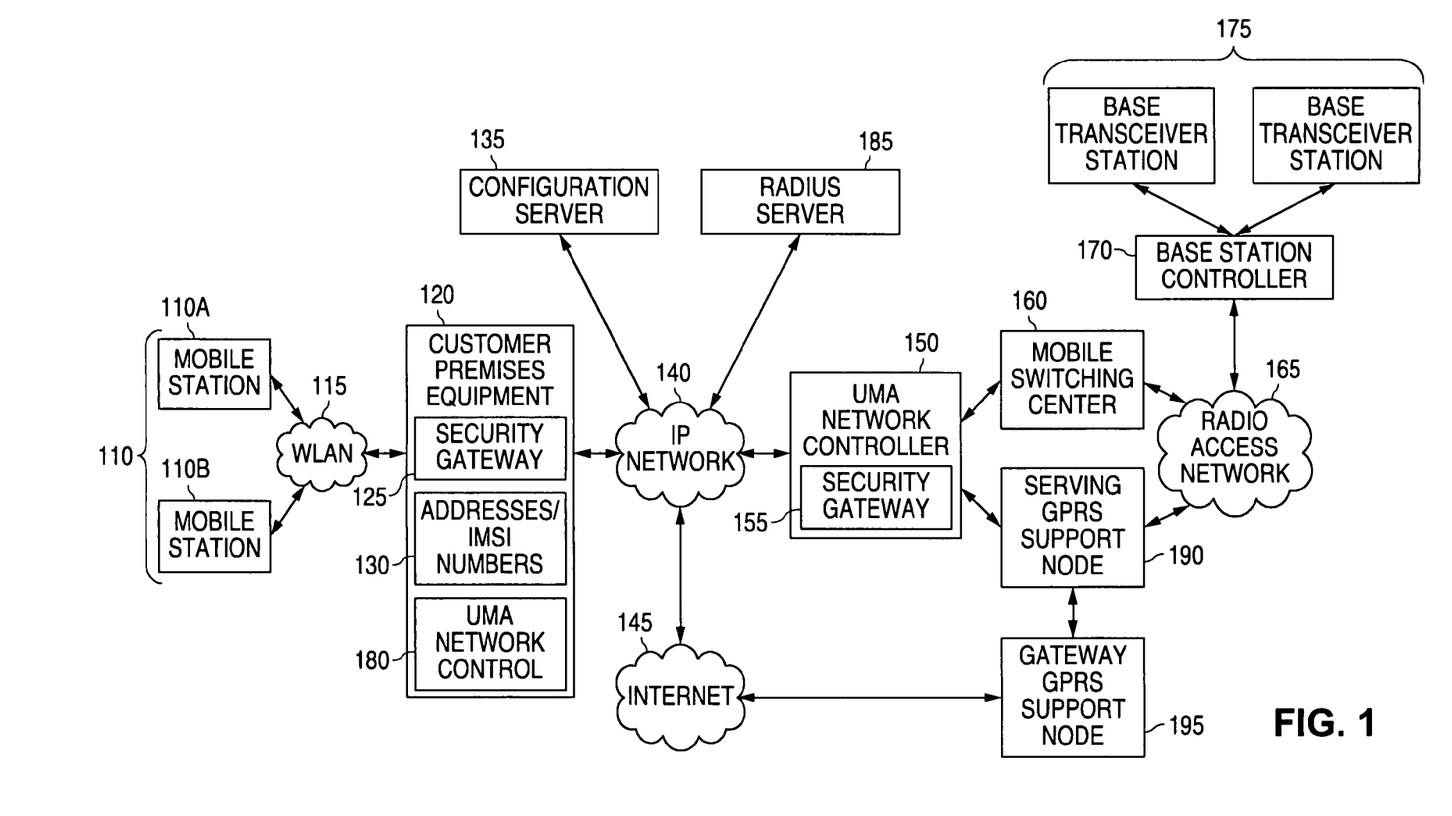
FIG. 1 is a block diagram illustrating a system supporting unlicensed mobile access (UMA) communication in accordance with an embodiment of the present invention.

Referring now to the drawings wherein the showings are for purposes of illustrating embodiments of the present invention only, and not for purposes of limiting the same, FIG. 1 is a block diagram illustrating a communications system 100 supporting unlicensed mobile access (UMA) communications in accordance with an embodiment of the present invention. As further described herein, various implementations of system 100 can facilitate efficient communications between co-located users of UMA services as well as between UMA users and IP-based resources. In particular, resources of a cellular service provider can be conserved and the routing of UMA-based communications can be improved through decentralization of UMA security gateway functionality to customer premises equipment of a residence or enterprise as further described herein.

As shown in FIG. 1, a plurality of mobile stations 110 (denoted 110A and 110B) are provided in communication with a wireless local access network (WLAN) 115. Mobile stations 110 may be implemented as communication devices adapted to support wireless communication through one or more unlicensed spectrum technologies such as IEEE 802.11, Bluetooth™, or other standards. In one embodiment, mobile stations 110 may be implemented as dual-mode mobile telephones capable of supporting communications through unlicensed spectrum technologies as well as GSM wireless networks. WLAN 115 may be implemented as any appropriate wireless network which supports one or more unlicensed spectrum technologies.

As illustrated, WLAN 115 is in communication with a customer premises equipment (CPE) device 120 which generally facilitates communication between mobile stations 110 and other portions of system 100 as further described herein. CPE device 120 may be implemented as any appropriate terminal, computing device, modem, or other device providing appropriate hardware and/or software to implement the various features of CPE device 120 further described herein. CPE device 120 includes security gateway 125 which may implement security features for UMA-based communication by users of mobile stations 110. For example, in one embodiment, security gateway 125 may provide for authentication of users of mobile stations 110, encryption and decryption of communications to and from mobile stations 110, routing of communications between mobile stations 110 and other portions of system 100, as well as other features of CPE device 120 further described herein. Advantageously, security gateway 125 may be located at a customer premises (e.g., at a business or residence of a user of one or more of mobile stations 110) and therefore can provide UMA-based security services to mobile stations 110 locally at CPE device 120.

CPE device 120 also includes a plurality of records 130 of International Mobile Subscriber Identity (IMSI) numbers, associated addresses of mobile stations 10, and Access Point Names (APNs) which will be further described herein in relation to the operation of CPE device 120. CPE device 120 may be further implemented to include UMA network control functionality 180 as further described herein. It will be appreciated that although CPE device 120 is illustrated in FIG. 1 as containing security gateway 125, records 130, and UMA network control functionality 180, the various illustrated aspects and described features of CPE device 120 may optionally be implemented as separate hardware and/or software components as may be desired in particular implementations.

It is contemplated that WLAN 115 in combination with CPE device 120 may effectively provide an active communication area, or "hotspot," in which mobile stations 110 may operate to send or receive wireless UMA communications through WLAN 115 and CPE device 120. For example, in one embodiment, it is contemplated that WLAN 115 and CPE device 120 may be located at a place of business or residence, thereby providing wireless UMA communication services to users of mobile stations 110 at such locations.

CPE device 120 is also in communication with an IP network 140. IP network may be implemented as an broadband communications network supporting Internet Protocol (IP) communications. For example, in one embodiment, IP network 140 may be in communication with the Internet 145 to facilitate optimal communication (for example, GPRS data communication) between mobile stations 110 and various Internet-based resources as further described herein.

CPE device 120 may be remotely configured over IP network 140 by a configuration server 135, such as an autoconfiguration server (e.g., an advanced configuration server) as such servers are known in the art. For example, in one embodiment, CPE device 120 may be managed by configuration server 135 via a TR-069 interface over a secure tunnel, such as an IPSec tunnel, as known in the art.

A UMA network controller (UNC) 150 is in communication with IP network 140 to facilitate communications between IP network 140 and a mobile switching center (MSC) 160 and communications between IP network 140 and a Serving GPRS Support Node (SGSN) 190. In one embodiment, UNC may communicate with IP network 140 through an "Up" interface, communicate with MSC 160 through an "A" interface, and communicate with SGSN 190 through a "Gb" interface as those communication interfaces will be understood by those skilled in the art and familiar with UMA communications. As illustrated, UNC 150 may further include a conventional security gateway 155 implemented in accordance with standard UMA technologies.

MSC 160 facilitates communication between UNC 150 and a radio access network (RAN) 165 and/or other networks which may be optionally connected with MSC 160. For example, in one embodiment, MSC 160 may provide circuit switching, mobility management, and GSM services between users of mobile stations 110 and other parties utilizing the services of RAN 165. SGSN 190 facilitates communications between UNC 150 and RAN 165 and/or other Gateway GPRS Support Nodes (GGSN) 195. For example, in one embodiment, GGSN 195 may provide IP services between users of mobile stations 110 and other parties utilizing the services of RAN 165. RAN 165 may be implemented as a cellular network in communication with one or more base station controllers 170 which form base station subsystems in combination with one or more base transceiver stations 175. It will be appreciated that one or more of MSC 160, SGSN 190, GGSN 195, RAN 165, base station controller 170, and base transceiver stations 175 may be provided by a cellular service provider as part of a GSM-based cellular network.

It will be appreciated by those skilled in the art that conventional UMA network controllers (for example, UNC 150) may provide the ability to re-direct users from a first security gateway of a first UMA network controller to a second security gateway of a second UMA network controller. In accordance with an aspect of the present invention, CPE device 120 may be augmented with such functionality which is generally associated with UMA network controllers. For example, in accordance with an embodiment of the present invention, CPE device 120 may be implemented to permit communications from conventional security gateway 155 of UNC 150 to be directed to the decentralized security gateway 125 of CPE device 120.

In this regard, CPE device 120 may have an associated public IP address. For example, such an IP address may be used by configuration server 135 to access CPE device 120 for management purposes. Because security gateway 125 may be implemented as part of CPE device 120, this IP address may also be associated with security gateway 125. Security gateway 155 may be implemented to export the IP address associated with CPE device 120 using, for example, a Remote Authentication Dial In User Service (RADIUS) tunnel client endpoint attribute as will be understood by those skilled in the art. By using the RADIUS tunnel client endpoint attribute of CPE device 120 and the IP address of CPE device 120 used for communication with configuration server 135, an individual mobile station 110 may be associated with a particular CPE device 120. Using this information, security gateway 155 of UNC 150 may redirect communications from security gateway 155 of UNC 150 to security gateway 125 of CPE device 120.

As a result, security gateway 125 of CPE device 120 may be perceived by UNC 150 as being associated with another UMA network controller when, in reality, security gateway 125 may reside at the premises of a user or subscriber, such as a user of mobile stations 110. As previously discussed, CPE device 120 (and therefore security gateway 125) may be located at a residence or business premises of a UMA communications user. Accordingly, security gateway 125 can provide security services local to CPE device 120 while remaining effectively decentralized from UNC 150. Security gateway 125 may be implemented to maintain a secure tunnel, such as an IPSec tunnel, between CPE device 120 and UNC 150. For example, in one embodiment, traffic of the IPSec tunnel may be provided to a designated virtual private network (VPN) concentrator maintained by UNC 150 to support security gateway 125.

In this regard, security gateway 125 may be responsible for relaying authentication (for example, Extensible Authentication Protocol (EAP) and Internet Key Exchange (IKE) version 2 authentication) and for sending RADIUS packets with embedded EAP messages to support an EAP-Subscriber Identity Module (SIM) or EAP-Authentication and Key Agreement (AKA) authentication dialogue with a remote authentication server (illustrated as RADIUS server 185), as such authentication protocols are understood by those skilled in the art. Security gateway 125 may be further implemented to receive a RADIUS Access Accept message which includes the following attributes: an International Mobile Subscriber Identity (IMSI) of an authenticating mobile station 110; a Mobile Subscriber Integrated Serviced Digital Network (MSISDN) number of the mobile station 110; an attribute corresponding to whether and what type of distributed processing is permitted to be implemented by CPE device 120 for the authenticated mobile station 110; and an attribute corresponding to the service identification used for Internet access by GGSN 195.

As discussed, CPE device 120 may be configured to support a site-to-site IPSec tunnel to and from UNC 150. In this regard, CPE device 120 may be responsible for relaying Up defined messages received from mobile stations 110 to the UNC 150 and for relaying Up defined messages received from the UNC 150 to the mobile station 110.

As illustrated, CPE device 120 may be implemented to provide distributed UMA network control functionality 180. In one embodiment, records 130 may be implemented to identify IMSI values corresponding to authenticated mobile stations 110 for which distributed UMA network control functionality 180 may be utilized. When receiving an Up message from a mobile station 110, the CPE device 120 may compare the mobile station 110 with records 130 to determine whether distributed UMA network control functionality 180 is permitted for the particular mobile station 110. For example, the CPE device 120 may selectively route messages received from mobile stations 110 across the Up interface to the site-to-site tunnel with the centralized UNC 150 depending on whether such comparison yields a match.

CPE device 120 may be further implemented to provide call control functionality for mobile stations 110. For example, in one embodiment, CPE device 120 may be implemented to selectively route voice calls between mobile station 110A and mobile station 110B. CPE device 120 may be further implemented to provide GPRS Support Node functionality and direct access to IP resources from CPE device 120 for mobile stations 110. For example, in one embodiment, CPE device 120 may be implemented to selectively route UMA-based data sessions directly to the Internet 145 from CPE device 120.

As further described herein, the implementation of security gateway 125 and distributed UMA network controller functionality 180 at CPE device 120 allows CPE device 120 to handle routing of voice communications between co-located mobile stations 110, as well as the routing of data communications from mobile stations 110 to the Internet 145, without consuming MSC 160, SGSN 190, and GGSN 195 resources (e.g., MSC 160 ports, SGSN 190 bandwidth, and GGSN 195 IP sessions). In this regard, CPE device 120 can be implemented to register active mobile stations 110 currently in the wireless access hotspot provided by WLAN 115 and CPE device 120. Communications from registered mobile stations 110 may then be routed to other mobile stations 110 or the Internet 145 without requiring such communications to pass through MSC 160, SGSN 190, or GGSN 195.

Figure 2:
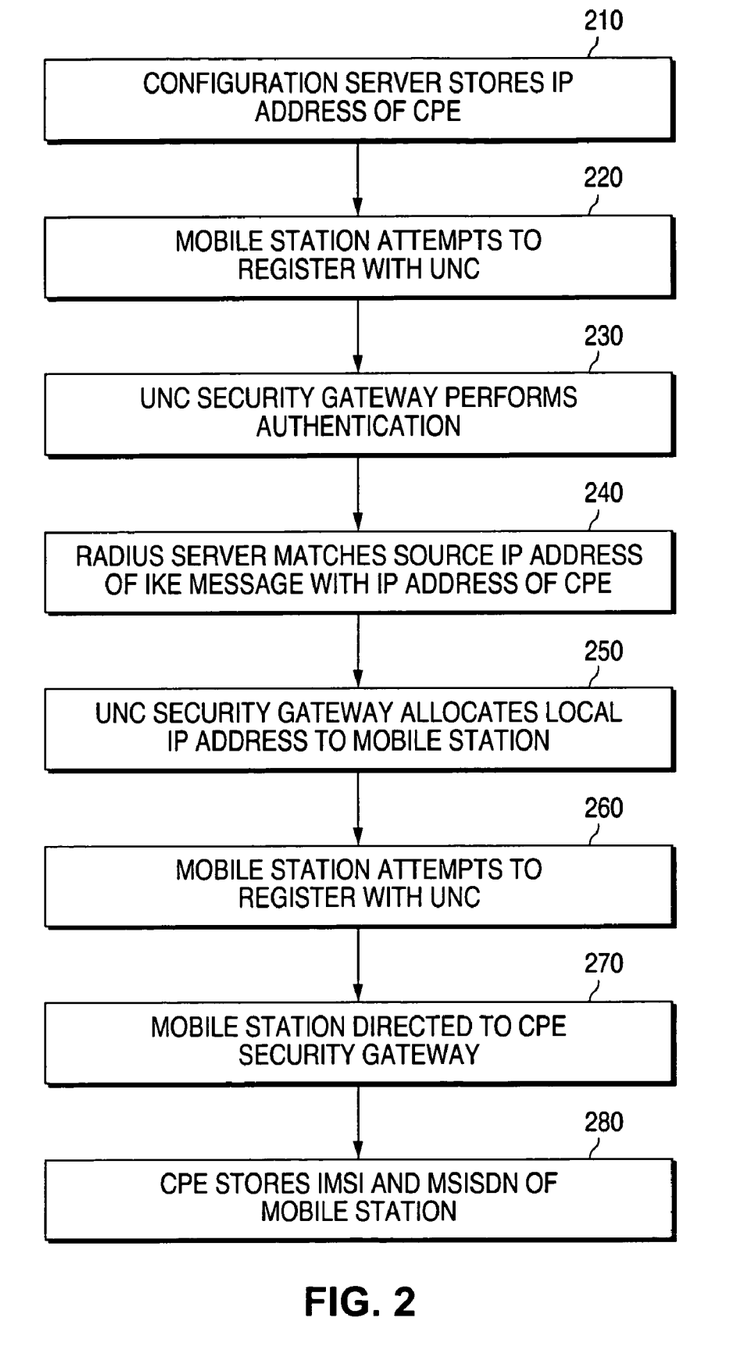
FIG. 2 is a flowchart illustrating a process for registering a mobile station with a customer premises equipment device in accordance with an embodiment of the present invention.

FIG. 2 is a flowchart illustrating a process for registering one of mobile stations 110 with CPE device 120 in accordance with an embodiment of the present invention. At the start of the process of FIG. 2, CPE device 120 may be unaware of which mobile stations 110, if any, are currently in range of WLAN 115. Therefore, at initial step 210, CPE device 120 will be in communication with the configuration server 135 to recover configuration information which may include, for example, Network Address Translation configuration information. At this step, the configuration server 135 will store an IP address associated with the CPE device 120 up-link interface.

At step 220, one of mobile stations 110 will associate with CPE device 120 and attempt to register with UNC 150. In response, the security gateway 155 of UNC 150 performs IKE authentication (step 230). As part of step 230, the security gateway 155 may send a RADIUS Access Request packet to RADIUS server 185 which includes the source IP address of the IKE message sent by the mobile station 110.

At step 240, RADIUS server 185 communicates with configuration server 135 to determine whether the source IP address of the IKE message matches the IP address of CPE device 120 previously stored in step 210. Upon receiving notice of a match, security gateway 155 will then allocate a local IP address to the mobile station 110 and may provide this local IP address to the RADIUS server 185 in a RADIUS Accounting Request packet (step 250).

If the mobile station 110 subsequently attempts to register with UNC 150 (step 260), UNC 150 may pass the local IP address of the mobile station 110 to RADIUS server 185 to authorize the mobile station 110 to access UMA services. If the RADIUS server determines that the local IP address allocated to the mobile station 110 is controlled by CPE device 120, then mobile station 110 can be directed to security gateway 125 in CPE device 120 (step 270) instead of security gateway 155 of UNC 150.

As a result, a communication session (i.e., TCP session) and IPSec tunnel between CPE device 120 and UNC 150 may be terminated, and a new IPSec security tunnel may be established with the security gateway 125 in CPE device 120. Accordingly, the security gateway 125 in CPE device 120 will be operable to authenticate the mobile station 110 by relaying RADIUS messages over the site-to-site tunnel to RADIUS Server 185. The RADIUS Server 185 may include in the Access Accept message the IMSI of the mobile station 110 together with an indication of whether optimal routing of voice calls and/or IP sessions are permitted for the mobile station 110. The RADIUS server 185 may be further operable to provide security gateway 125 with the Mobile Subscriber Integrated Services Digital Network (MSISDN) number of the mobile station 110 and the service identifier used by the GGSN 195 for Internet access. Upon receiving the IMSI number and MSISDN, CPE device 120 stores the association between the extracted address and IMSI number as one or more records 130 together with an indication of whether optimal routing of calls and or IP sessions is supported and IP service identifier (step 280).

Accordingly, as a result the performance of the process of FIG. 2, CPE device 120 will have registered an active mobile station 110 in proximity to WLAN 115 and CPE device 120. By repeatedly performing the process of FIG. 2 for all of mobile stations 110, CPE device 120 can be provided with records of all mobile stations 110 currently within range of WLAN 115. Following the performance of the process of FIG. 2, CPE device 120 may proceed to route communications to and from registered mobile stations 110 in accordance with various embodiments of the present invention as further described, for example, with respect to FIG. 3 below.

Figure 3:
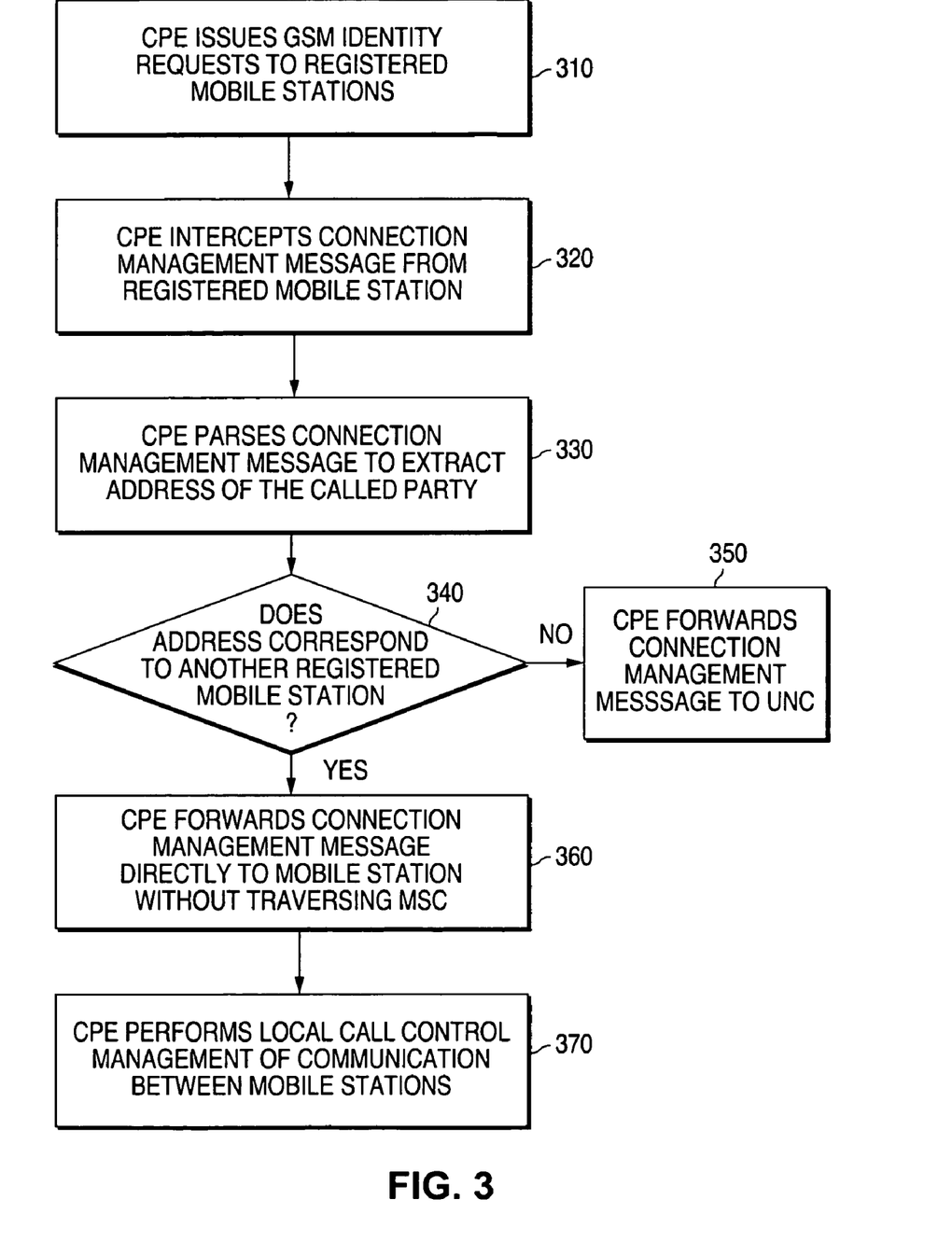
FIG. 3 is a flowchart illustrating a process for routing communications between mobile stations in accordance with an embodiment of the present invention.

FIG. 3 is a flowchart illustrating a process for routing communications between mobile stations 110 in accordance with an embodiment of the present invention. In initial step 310, CPE device 120 operates to keep track of mobile stations 110 previously registered in the process of FIG. 2. Specifically, at step 310, CPE device monitors those mobile stations 110 for which the RADIUS server 185 has indicated that it is permitted to support optimal routing of voice and or IP sessions.

In step 320, CPE device 120 enters UMA call processing mode for a mobile station 110 for which it is permitted to perform optimal voice routing. Specifically, CPE device 120 will operate to intercept connection management messages (i.e., call setup requests) issued by registered mobile stations 110. In one embodiment, such connection management messages may be provided in accordance with GSM recommendation 4.08 and the Connection Management sublayer of the GSM signaling protocol as will be understood by those skilled in the art. In this regard, it will be appreciated that when one of mobile stations 110 wishes to initiate communications, it may issue a connection management message that includes an address corresponding to the called party. For example, in one embodiment, the connection management message may identify an E.164 number of the called party which is encoded in binary coded decimal (BCD) format.

At step 330, CPE device 120 parses the intercepted connection management message to extract the address (for example, an E.164 number) identifying the called party. If the extracted address does not correspond to an address in records 130 of one of mobile stations 110 currently registered with CPE device 120 (step 340), CPE device 120 forwards the connection management message to UNC 150 which then interfaces with MSC 160 to route the call in accordance with conventional GSM techniques (step 350).

However, if the extracted address corresponds to an address in records 130, then CPE device 120 will know that both the calling party (for example, mobile station 110A) as well as the called party (for example, mobile station 110B) are both registered with CPE device 120 and are therefore in communication with WLAN 115. As a result, CPE device 120 can forward the connection management message directly from mobile station 110A to mobile station 100B (step 360) without requiring the message to pass through IP network 140, UNC 150, or MSC 160.

As previously discussed, CPE device 120 can be implemented to provide call control functionality in accordance with conventional UNC and MSC implementations, thereby allowing CPE device 120 to further perform local call control operations to manage the communication between mobile station 110A and mobile station 110B (step 370). Moreover, because decentralized security gateway 125 is provided in CPE device 120, such communications need not be sent remotely through conventional security gateway 150 of UNC 150. As a result, bandwidth and port resources of UNC 150 and MSC 160 can be conserved.

Figure 4:
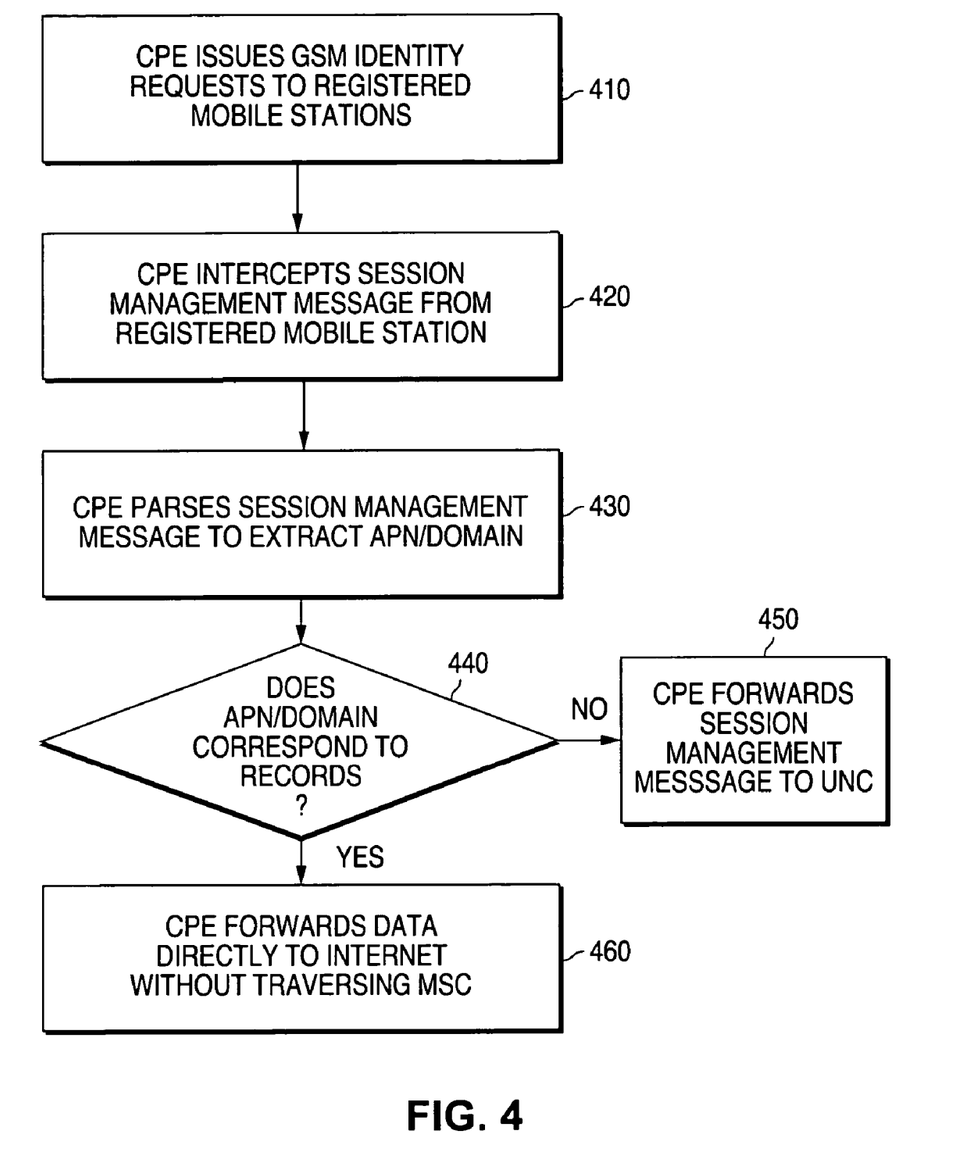
FIG. 4 is a flowchart illustrating a process for routing communications between a mobile station and the Internet in accordance with an embodiment of the present invention.

In addition to the voice call routing features discussed above in relation to FIG. 3, CPE device 120 may also efficiently route UMA-based data communications (for example, GPRS communications) from mobile stations 110 to IP resources of the Internet 145. FIG. 4 is a flowchart illustrating a process for routing communications between a mobile station and the Internet in accordance with an embodiment of the present invention.

In initial step 410, CPE device 120 operates to keep track of previously registered mobile stations 110 in the manner previously described with regard to step 310 of FIG. 3. CPE device 120 may then enter a UMA and GPRS Serving Node (GSN) processing mode for a mobile station 110 for which it is permitted to perform optimal IP routing. Accordingly, in step 420, the CPE device 120 operates to intercept GPRS Session Management messages (i.e., Activate PDP Context Request) issued by registered mobile stations 110. In one embodiment, such session management messages may be provided in accordance with GSM recommendation 4.08 and the GPRS Session Management sublayer of the GSM signaling protocol as will be understood by those skilled in the art. In this regard, it will be appreciated that when one of mobile stations 110 wishes to initiate communications, it may issue a session management message that includes an APN corresponding to a specific routing domain that it wants to connect to. For example, in one embodiment, the session management message may identify an APN which is encoded in a string format.

In step 430, CPE device 120 may parse the intercepted session management message to extract the APN identifying routing domain the mobile station 110 is requesting to communicate with. If the extracted APN does not correspond to an APN string stored in records 130 associated with the authenticated mobile station (step 440), CPE device 120 forwards the session management message to UNC 150 which then interfaces with SGSN 190 to route the connection via the GGSN 195 in accordance with conventional GSM techniques (step 450).

However, if the extracted APN corresponds to a string in records 130 (step 440), then CPE device 120 will know that optimal IP routing is permitted for this domain. As a result, CPE device 120 can terminate the session management procedure and forward messages (i.e., datagrams) received to and from the mobile station 110 for the APN directly to the Internet 145 without requiring the messages to pass through UNC 150, SGSN 190, or GGSN 195 (step 460).

In view of the foregoing, it will be appreciated that various embodiments of the present invention can provide efficient routing of communications between co-located users (i.e., sharing a common hotspot) of mobile stations without consuming resources of a radio access network or mobile switching center maintained by a cellular service provider. Such resource savings can be particularly advantageous in systems having a large volume of UMA-based communications between co-located users, such as in residential or business environments subscribing to flat rate pricing schemes. In addition, the use of a decentralized security gateway as described herein can provide efficient routing of UMA-based data communications for users of appropriately-configured customer premises equipment.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can stored on one or more computer readable mediums. It is also contemplated that software identified herein can be implemented using one or more general purpose or specific purpose computers and/or computer systems, networked and/or otherwise.

Where applicable, the ordering of various steps described herein can be changed, combined into composite steps, and/or separated into sub-steps to provide features described herein. The foregoing disclosure is not intended to limit the present invention to the precise forms or particular fields of use disclosed. It is contemplated that various alternate embodiments and/or modifications to the present invention, whether explicitly described or implied herein, are possible in light of the disclosure.

Having thus described embodiments of the present invention, persons of ordinary skill in the art will recognize that changes may be made in form and detail without departing from the scope of the invention. Thus the invention is limited only by the following claims.

What is claimed is:

1. A method of providing a communication link between a first mobile station and a second mobile station through a customer premises equipment (CPE) device, the method comprising:
    intercepting a call setup request to a first security gateway of an unlicensed mobile access network controller (UNC) and redirecting the call setup request to be received at a second security gateway of the CPE device, wherein:
        the call setup request is provided by the first mobile station, and
        communications from the first mobile station are redirected from the first security gateway of the UNC to the second security gateway of the CPE device;
    extracting an address from the call setup request, wherein the address is associated with the second mobile station;
    comparing the address with a plurality of records maintained by the CPE device, wherein the records identify a plurality of mobile stations registered with the CPE device;
    forwarding the call setup request to the second mobile station if the address corresponds to at least one of the records, wherein:
        the CPE device routes communications to and from the first mobile station and the second mobile station without requiring the call setup request to pass through the first security gateway, and
        the first mobile station and the second mobile station are in communication with the CPE device over a wireless local access network (WLAN) in accordance with an unlicensed mobile communication standard; and
    registering the first and second mobile stations with the CPE device prior to the intercepting, wherein:
        if the first mobile station attempts to register with the first security gateway of the UNC and the first mobile station is determined to be controlled by the CPE device, then the first mobile station is directed to the second security gateway of the CPE device instead of the first security gateway of the UNC, and
        a new internet protocol security (IPSec) security tunnel is established for the first mobile station with the second security gateway of the CPE device, making the second security gateway of the CPE device operable to authenticate the first mobile station.

2. The method of claim 1, further comprising routing a data communication from at least one of the mobile stations to a data network in communication with the CPE device.

3. The method of claim 1, further comprising forwarding the call setup request to an unlicensed mobile access (UMA) network controller if the address does not correspond to at least one of the records.

4. The method of claim 1, wherein the first and second mobile stations support unlicensed mobile access (UMA) and Global System for Mobile (GSM) network communications.

5. The method of claim 1, wherein the unlicensed mobile communication standard is an IEEE 802.11 standard.

6. The method of claim 1, wherein the unlicensed mobile communication standard is Bluetooth.

7. A communications system comprising:
    a customer premises equipment (CPE) device;
    a first security gateway maintained by the CPE device;
    a plurality of records maintained by the CPE device, wherein the records identify a plurality of mobile stations registered with the CPE device;
    a processor of the CPE device in communication with the first security gateway and the records; and
    a memory of the CPE device in communication with the processor, the memory comprising a machine-readable medium having executable instructions that, when executed, instruct the processor to perform a method of providing a communication link between a first mobile station and a second mobile station through the CPE device, the method comprising:
        intercepting a call setup request to a second security gateway of an unlicensed mobile access network controller (UNC) and redirecting the call setup request to be received at the first security gateway of the CPE device, wherein:
            the call setup request is provided by the first mobile station, and
            communications from the first mobile station are redirected from the second security gateway of the UNC to the first security gateway of the CPE device,
        extracting an address from the call setup request, wherein the address is associated with the second mobile station,
        comparing the address with the records,
        forwarding the call setup request to the second mobile station if the address corresponds to at least one of the records, wherein:
            the CPE device routes communications to and from the first mobile station and the second mobile station without requiring the call setup request pass through the second security gateway, and
            the first mobile station and the second mobile station are in communication with the CPE device over a wireless local access network (WLAN) in accordance with an unlicensed mobile communication standard; and
        registering the first and second mobile stations with the CPE device prior to the intercepting, wherein:
            if the first mobile station attempts to register with the first security gateway of the UNC and the first mobile station is determined to be controlled by the CPE device, then the first mobile station is directed to the second security gateway of the CPE device instead of the first security gateway of the UNC, and a new internet protocol security (IPSec) security tunnel is established for the first mobile station with the second security gateway of the CPE device, making the second security gateway of the CPE device operable to authenticate the first mobile station.

8. The communications system of claim 7, wherein the CPE device routes a data communication from at least one of the mobile stations to a data network in communication with the CPE device.

9. The communications system of claim 7, wherein the method further comprises forwarding the call setup request to an unlicensed mobile access (UMA) network controller if the address does not correspond to at least one of the records.

10. The communications system of claim 7, wherein the first and second mobile stations support unlicensed mobile access (UMA) and Global System for Mobile (GSM) network communications.

11. A customer premises equipment device comprising
means for providing a wireless local access network (WLAN) in accordance with an unlicensed mobile communication standard;
means for providing a first security gateway at a customer premises and in communication with the WLAN;
means for registering a plurality of mobile stations in communication with the WLAN;
a plurality of records identifying the mobile stations registered by the registering means;
means for intercepting a call setup request to a second security gateway of an unlicensed mobile access network controller (UNC) and redirecting the call setup request to be received at the first security gateway of the CPE device, wherein:
the call setup request is provided by a first mobile station, and
communications from the first mobile station are redirected from the second security gateway of the UNC to the first security gateway of the CPE device;
means for extracting an address from the call setup request, wherein the address is associated with a second mobile station;
means for comparing the address with the records; and
means for forwarding the call setup request to the second mobile station if the address corresponds to at least one of the records;
means for routing communications to and from the first mobile station and the second mobile station without requiring the call setup request to pass through the second security gateway; and
means for registering the first and second mobile stations with the CPE device prior to the intercepting means intercepting the call setup request, wherein:
if the first mobile station attempts to register with the first security gateway of the UNC and the first mobile station is determined to be controlled by the CPE device, then the first mobile station is directed to the second security gateway of the CPE device instead of the first security gateway of the UNC, and
a new internet protocol security (IPSec) security tunnel is established for the first mobile station with the second security gateway of the CPE device, making the second security gateway of the CPE device operable to authenticate the first mobile station.

12. The customer premises equipment device of claim 11, further comprising means for routing a data communication from at least one of the mobile stations to a data network in communication with the customer premises equipment device.

13. A method of providing a communication link between a mobile station and a data network through a customer premises equipment (CPE) device, the method comprising:
intercepting a session management message to a first security gateway of an unlicensed mobile access network controller (UNC) and redirecting the session management message to be received at a second security gateway of the CPE device, wherein:
the session management message is provided by the mobile station and
communications from the first mobile station are redirected from the first security gateway of the UINC to the second security gateway of the CPE device;
extracting a domain from the session management message, wherein the domain is accessible through the data network;
comparing the domain with a plurality of records maintained by the CPE device, wherein the records identify a plurality of domains accessible by the mobile station;
forwarding the session management message to the domain through the data network if the domain corresponds to at least one of the records, wherein:
the CPE device routes communications to and from the mobile station and the domain without requiring the session management message to pass through the first security gateway, and
the mobile station is in communication with the CPE device over a wireless local access network (WLAN) in accordance with an unlicensed mobile communication standard; and
registering the first and second mobile stations with the CPE device prior to the intercepting, wherein:
if the first mobile station attempts to register with the first security gateway of the UNC and the first mobile station is determined to be controlled by the CPE device, then the first mobile station is directed to the second security gateway of the CPE device instead of the first security gateway of the UNC, and
a new internet protocol security (IPSec) security tunnel is established for the first mobile station with the second security gateway of the CPE device, making the second security gateway of the CPE device operable to authenticate the first mobile station.

14. The method of claim 13, wherein the data network is the Internet.

15. The method of claim 13, further comprising forwarding the session management message to an unlicensed mobile access (UMA) network controller if the domain does not correspond to at least one of the records.

16. The method of claim 13, wherein the mobile station supports unlicensed mobile access (UMA) and Global System for Mobile (GSM) network communications.

17. The method of claim 13, wherein the unlicensed mobile communication standard is an IEEE 802.11 standard.

18. The method of claim 13, wherein the unlicensed mobile communication standard is Bluetooth.

* * * * *